(12) United States Patent
Ezhov

(10) Patent No.: US 7,929,066 B2
(45) Date of Patent: Apr. 19, 2011

(54) STEREOSCOPIC METHOD AND A DEVICE FOR IMPLEMENTATION THEREOF

(75) Inventor: Vasily Alexandrovich Ezhov, Moscow (RU)

(73) Assignee: Stunny 3D, LLC, Moscow (RU)

(*) Notice: Subject to any disclaimer, the term of this patent is extended or adjusted under 35 U.S.C. 154(b) by 0 days.

(21) Appl. No.: 12/595,845

(22) PCT Filed: Apr. 15, 2008

(86) PCT No.: PCT/RU2008/000233
§ 371 (c)(1),
(2), (4) Date: May 17, 2010

(87) PCT Pub. No.: WO2008/130277
PCT Pub. Date: Oct. 30, 2008

(65) Prior Publication Data
US 2010/0295930 A1 Nov. 25, 2010

(30) Foreign Application Priority Data
Apr. 20, 2007 (RU) ............................... 2007114915

(51) Int. Cl.
G02F 1/1335 (2006.01)
(52) U.S. Cl. .............. 349/15; 349/1; 359/246; 359/256; 359/462; 359/464; 359/465
(58) Field of Classification Search ............... 349/1, 15; 359/246, 256, 462, 464, 465
See application file for complete search history.

(56) References Cited

U.S. PATENT DOCUMENTS

| 4,884,876 A | 12/1989 | Lipton et al. | |
|---|---|---|---|
| 5,969,850 A | 10/1999 | Harrold et al. | |
| 6,058,211 A * | 5/2000 | Bormans et al. | 382/235 |
| 2009/0201309 A1* | 8/2009 | Demos | 345/589 |

FOREIGN PATENT DOCUMENTS

| RU | 2 097 940 C1 | 11/1997 |
|---|---|---|
| RU | 2 260 829 C2 | 2/2004 |
| RU | 2 306 680 C1 | 9/2007 |
| WO | WO 2007/024118 A1 | 3/2007 |

OTHER PUBLICATIONS

Amimori et al., "Deformed nanostructure of photo-induced biaxial cholesteric films and their application in VA-mode LCDs," Journal of the SID, 2005, 13(9):799-804.
Ezhov et al., "Volume (or stereoscopic) images on the screens of standard computer and television displays," Proceedings of SPIE, 2005, 5821:102-116.
Luh et al., "A broadband circularly polarized film," Journal of the SID, 2003, 11(3):457-460.
Surman et al., "The construction and performance of a multiviewer 3-D television display," Journal of the SID, 2005, 14(4):329-334.

* cited by examiner

Primary Examiner — Jennifer Doan
(74) Attorney, Agent, or Firm — Foley & Lardner LLP

(57) ABSTRACT

The invention relates to stereoscopic video equipment and can be used to design stereoscopic TV sets and monitors with a possibility to observe stereo images both glasses-free and with use of passive glasses while keeping a possibility to observe monoscopic images. These possibilities are provided in the method and in the device by means of a light flux elliptical polarization modulator with polarization modulation parameters determined by inverse trigonometric functions such as arctg, arcctg, arccos and arcsin (or their combinations) from algebraic relations between squared amplitudes of image temporal scanning signals, that permits with help of spatially-periodic polarization selector to obtain the images of the left and the right views in the left and right observation areas.

19 Claims, 8 Drawing Sheets

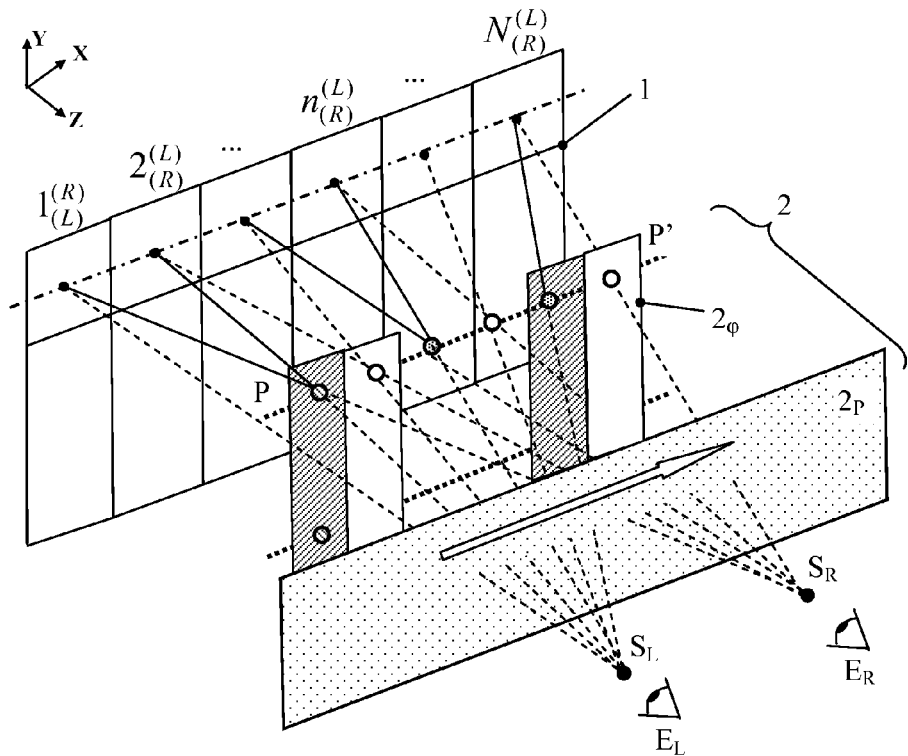
Drawing 1
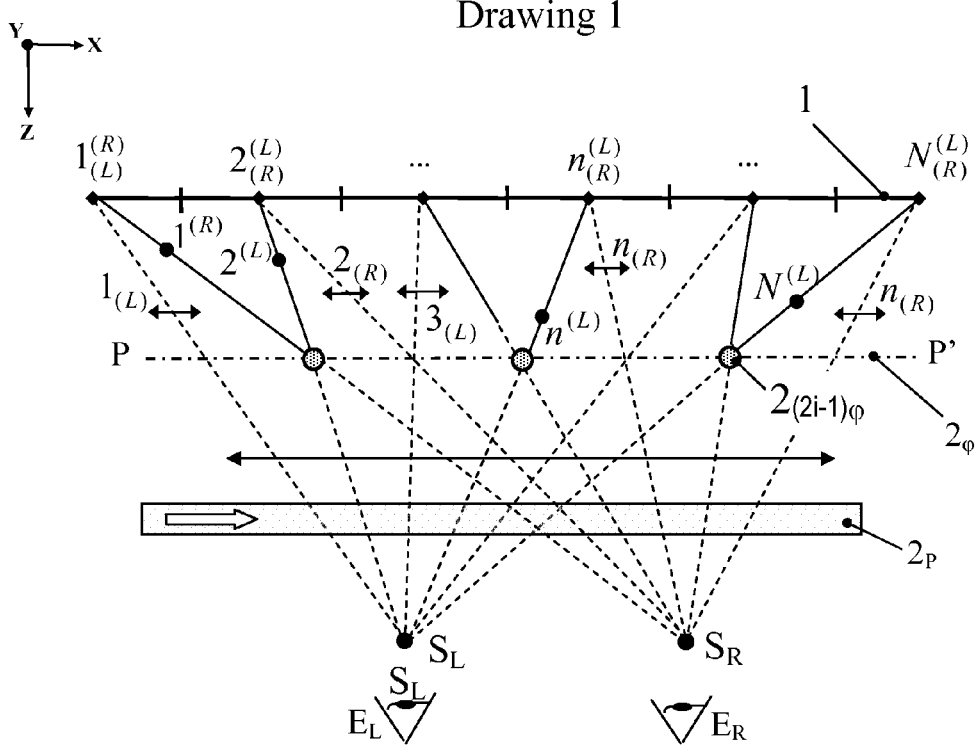
Drawing 2

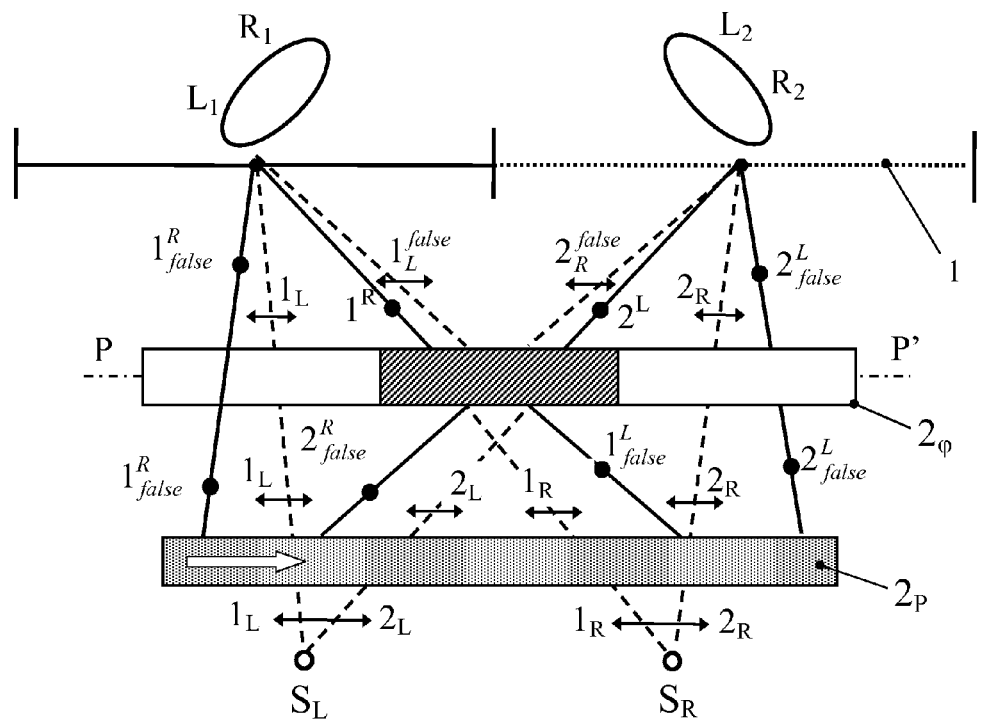
Drawing 3
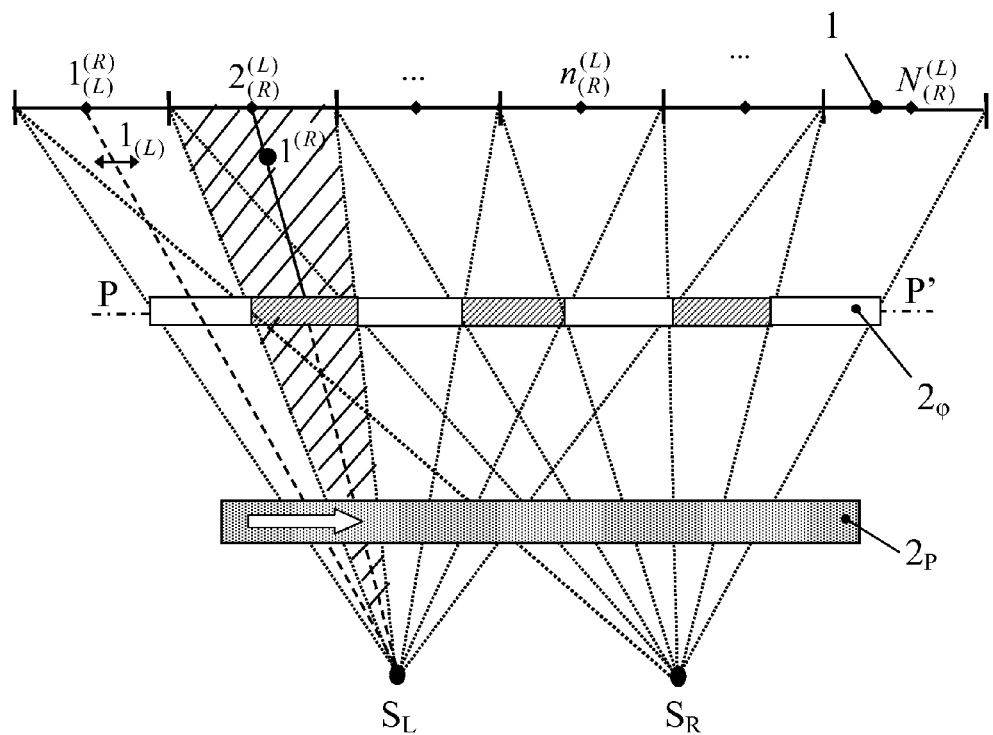
Drawing 4

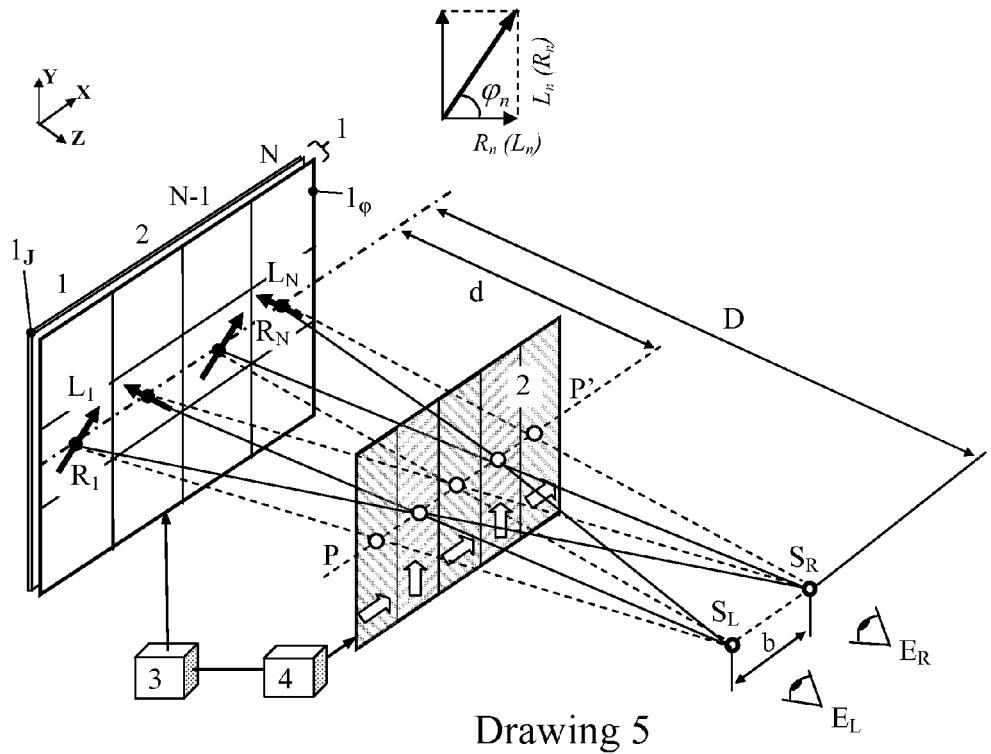
Drawing 5
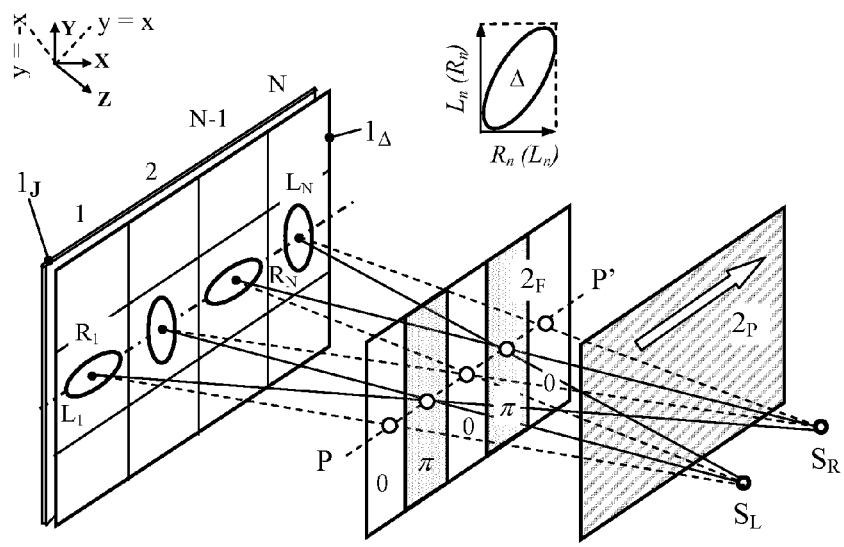
Drawing 6

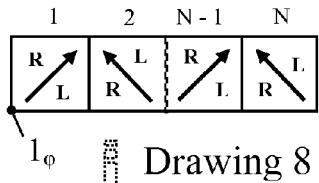
Drawing 8
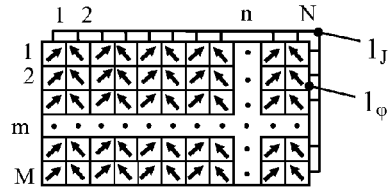
Drawing 7
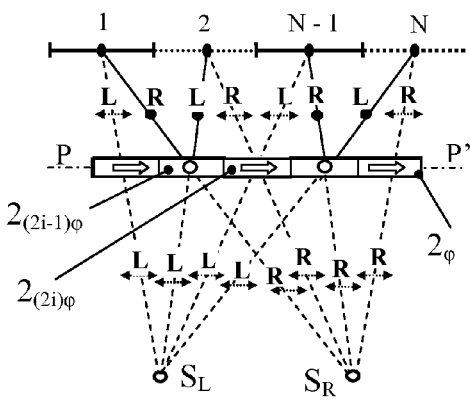
Drawing 9
Drawing 10
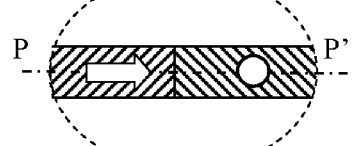
Drawing 11
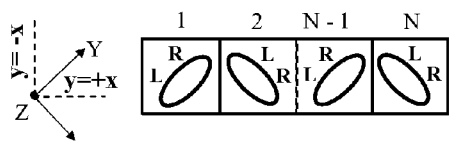
Drawing 13
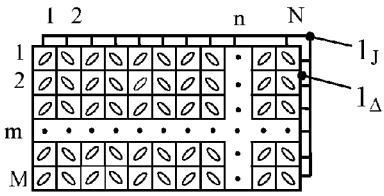
Drawing 12
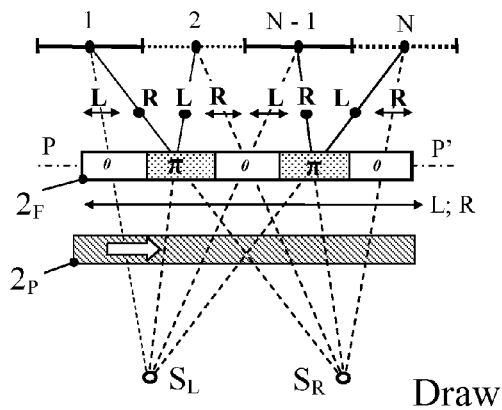
Drawing 14

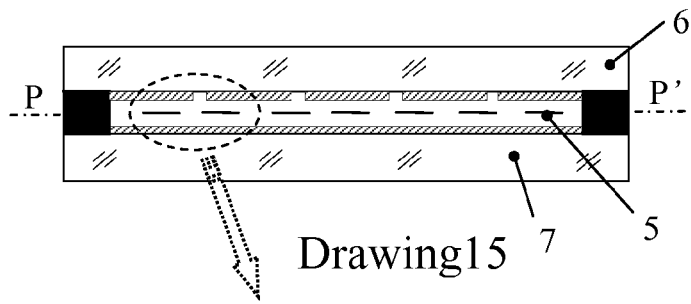
Drawing 15
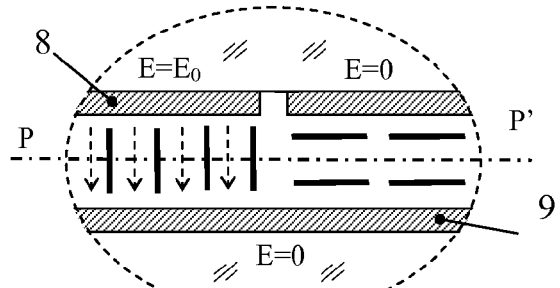
Drawing 16
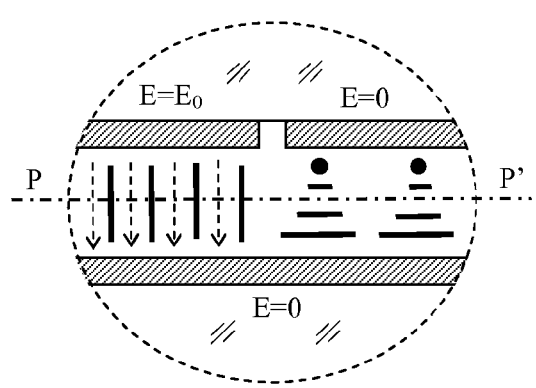
Drawing 17
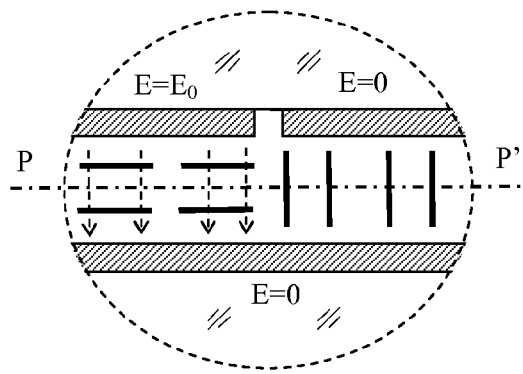
Drawing 18

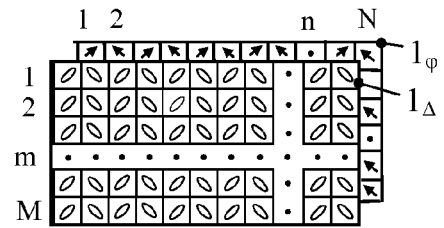
Drawing 19
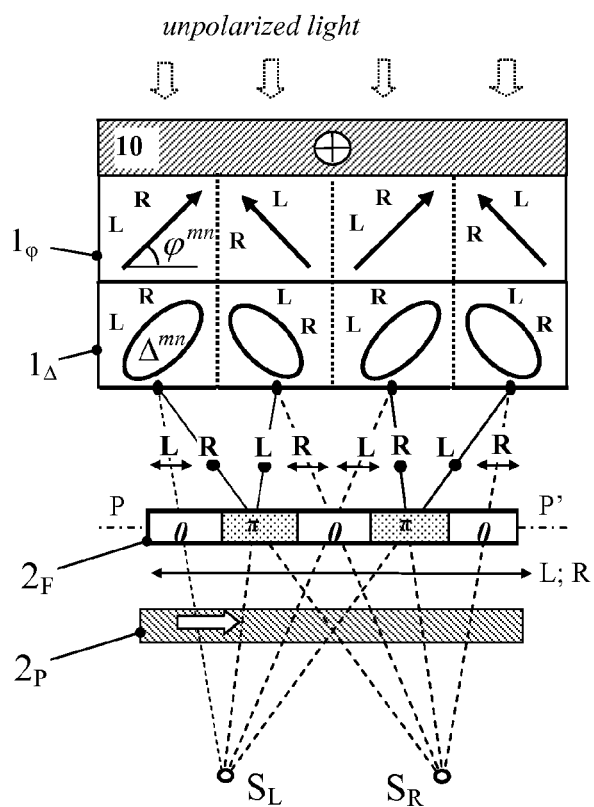
Drawing 20
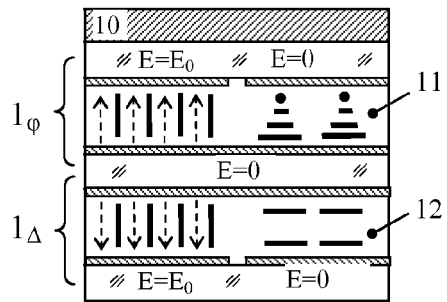
Drawing 21

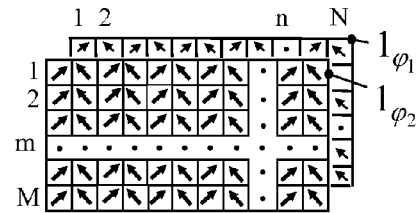
Drawing 22
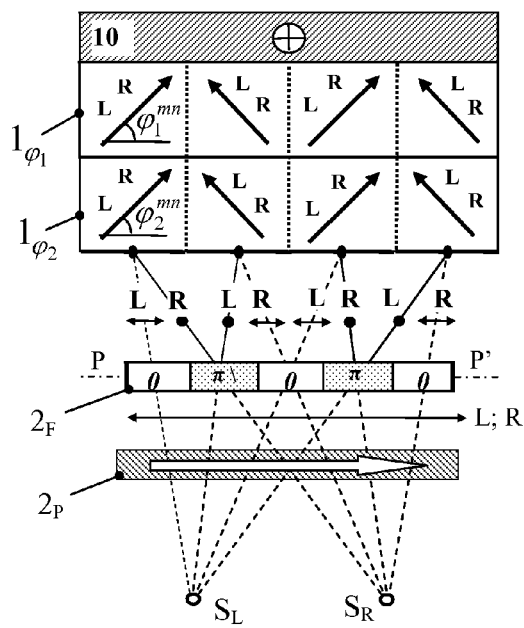
Drawing 23
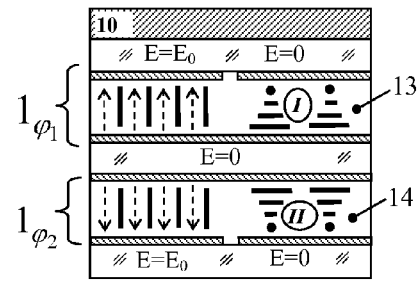
Drawing 24
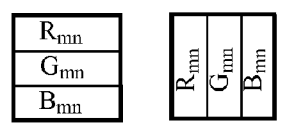
Drawing 26
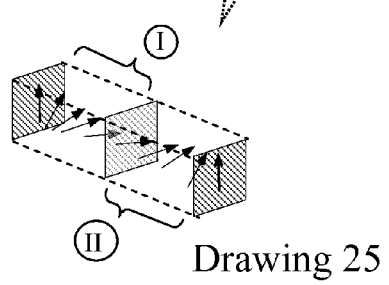
Drawing 25

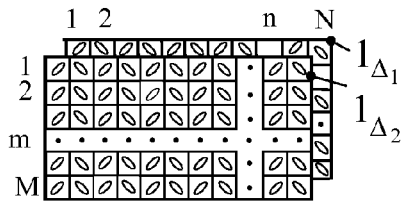
Drawing 27
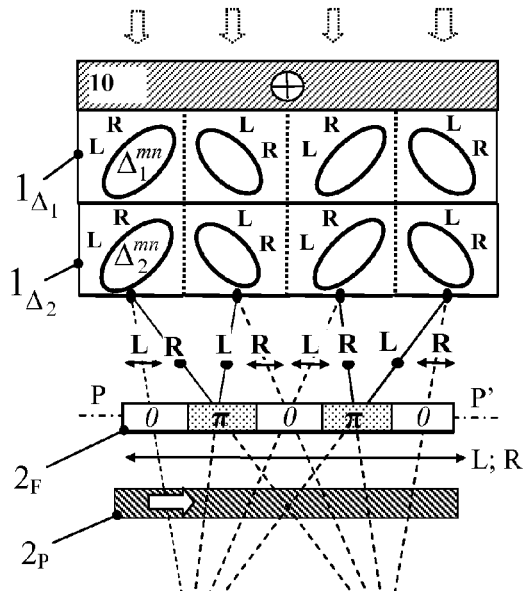
Drawing 28
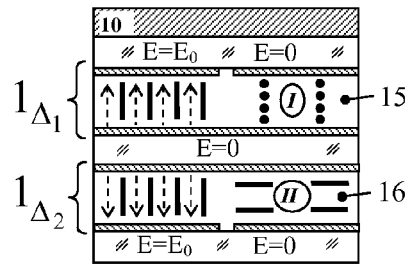
Drawing 29
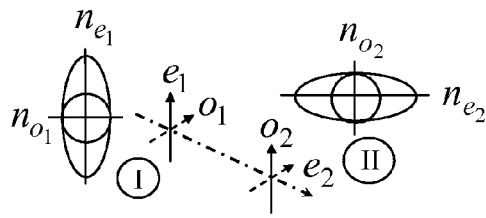
Drawing 31
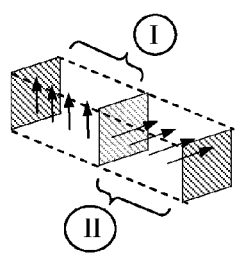
Drawing 30

US 7,929,066 B2

STEREOSCOPIC METHOD AND A DEVICE FOR IMPLEMENTATION THEREOF

CROSS-REFERENCE TO RELATED APPLICATIONS

This application is a National Stage application of PCT/RU2008/000233, filed Apr. 15, 2008, which claims priority from Russian Federation application 2007114915, filed Apr. 20, 2007.

FIELD OF INVENTION

The invention relates to three-dimensional imaging, more precisely, to stereoscopic video imaging, and can be used to design stereoscopic television sets and computer monitors with a possibility to observe stereo images both glasses-free and with use of passive (non-switchable) stereo glasses while keeping a possibility to observe monoscopic images.

PRIOR KNOWLEDGE

From publication of Surman Ph. et al. The construction and performance of a multi view 3-D television display (Journal of the SID, 2005, v. 13. No. 4, p. 329) a glasses-free method for observations of stereo images is known; this method comprises in that groups of odd and even columns of a matrix-addressed optical modulator or generator form a light flux which intensity is modulated directly proportional to the integral luminosity $B_L^{mn}$ of the left L and to the integral luminosity $B_R^{mn}$ the right R views of a stereo image accordingly, with help of spatially periodic modulation of the light optical path created by a raster of cylindrical lenses there are deflected to the left and right observation areas the partial light fluxes corresponding to the groups of odd and even columns of the cross-section, where m=1, 2, ..., M, n=1, 2, ..., N, where M and N are the numbers of rows and columns in the matrix optical modulator (generator).

The advantage of the known method can be a possibility to observe a stereo image glasses-free to assure observer's comfort. The drawback of the known method can be twice decreased to M(N/S) value a spatial resolution in each view, so it is twice lower than the full optical modulator resolution M×N. Also the number of elements in the reproduced image is decreased along only one of image coordinates as images of each view have N/2 columns but the number M of rows in the reproduced image remains the same, so that creates an additional problem to keep the required aspect ratio of the image. For example, in this method the liquid-crystal display with resolution M×N=720×576 elements (for PAL and SECAM systems) can not be used to reproduce a stereo image with 720×576 elements as the resolution (N/2)M=360×576 will be twice lower for each view; moreover, it is impossible to keep in each view the required initial image aspect ratio 4:3 as for the image with 360×576 elements this ratio is equal to 2:3. If one makes special matrix-addressed optical modulators with a non-standard aspect ratio 8:3 for simultaneous playing of two views with an aspect ratio 4:3 using this method, then this solution will create a problem when reproducing standard monoscopic (single view) images as the required 4:3 view ratio is not kept for them. This problem together with impossibility of electrical switch-off the action of raster of ordinary cylindrical lenses results in a practical impossibility to use the known method to ensure compatibility with monoscopic imaging; one should also to take into consideration that is practically impossible temporarily to remove mechanically the raster of lens (to make it demountable) in order to see monoscopic images because each time after such removal a precision alignment of the three-dimensional position of the lens raster would be required.

RU 2306680 patent (hereinafter referred to as [2]) describes a stereo image observation method with a full resolution for each view that comprises in that the light flux is formed with use of complex modulation of amplitude, and due to the latter the integral luminosities of the images of left $B_L^{mn}$ and right $B_R^{mn}$ views of a three-dimensional scene are introduced jointly in the mn-th element of the light flux cross-section, whereas the parameters of coding elliptic modulation of light polarization are represented in the form of inverse trigonometric functions from algebraic relations between $B_L^{mn}$ and $B_R^{mn}$, where m=1, 2, ..., M, n=1, 2, ..., N, and M×N are the numbers of rows and columns in polarization coding optical modulator, and with help of polarization filters that are made as passive stereo glasses, the partial light fluxes of the left and the right view images are separated and routed to the left and right observation areas.

The document [2] also contains a description of a device for observation of multi view images with double resolution in each view and with a possibility to see monoscopic image, the device contains a source of multi view video signal, an electronic function module and sequentially arranged at a one and the same optical axis an electrically controlled matrix-addressed polarization coding optical modulator and a polarization selector in the form of passive stereo glasses whose two windows contain two polarization filters with mutually orthogonal polarization states, and for the polarization coding optical modulator the transfer characteristic of its mn-th element is determined by inverse trigonometric function from a ratio of linear combinations of $(S_L^{mn})^2$ and $(S_R^{mn})^2$, where $S_L^{mn}$ and $S_R^{mn}$ are the signals whose squared amplitudes correspond to the values of $B_L^{mn}$ and $B_R^{mn}$ of the mn-th pixels of the images in the left and right views, whereas the output of the stereo video signal source is connected to electrical input of the polarization coding optical modulator and to electrical input the electronic function module whose output is connected to the input of the polarization selector, where m=1, 2, ..., M, n=1, 2, ..., N, and M×N are the numbers of rows and columns in the polarization coding optical modulator.

The advantage of the known method and device is the use of the full spatial resolution M×N of the polarization encoding optical modulator (generator) for each of two stereo image views presented the observer, in spite of the fact that both views are reproduced jointly (simultaneously) at the same screen. And for transferring to observation of monoscopic images it is enough to remove stereo glasses and to change the device over to monoscopic image formation mode.

The use of stereo glasses provides a greater freedom of movement for the observer (as in this case the observation areas, that are defined by the position of the windows of stereo glasses, automatically move together with the observer); however mandatory presence of stereo glasses reduces comfort of stereo image observation using the known method and the device.

The object matter of the invention is to expand the functionality of the method and the device based on formation of the glasses-free stereo imaging.

DISCLOSURE OF THE INVENTION

The given task is solved as follows: in the method in which with help of a matrix-addressed polarization coding optical modulator or generator a light flux is formed that has complex amplitude modulation at the expense of which in the mn-th element of the light flux the cross-section integral luminosities $B_L^{mn}$ and $B_R^{mn}$ of the mn-th pixels of the left L and the right R views of a three-dimensional scene are jointly presented, and the parameters of the coding elliptic modulation of light polarization are set in the form of inverse trigonometric functions of algebraic relations of $B_L^{mn}$ and $B_R^{mn}$, where m=1, 2, ..., M, n=1, 2, ..., N, and M×N is the number of rows and columns in the polarization coding optical modulator, and with help of a phase and/or polarization selector the partial light fluxes, that correspond to the left and right views, are separated and routed to the left and to the right observation areas, and according to the invention, at the n-th column of the polarization coding optical modulator there is formed the n-th group of the first and the second partial light fluxes carrying information about the n-th columns of the left and the right image views accordingly, whereas the parameters of polarization coding elliptic modulation are determined mutually orthogonal as well between two partial light fluxes in the n-th group as between the n-th and the (n+1)-th groups of partial light fluxes, with help of phase- and/or polarization selector the views are decoded in the decoding plane and afterwards are filtered by polarization, whereas the decoding plane is divided into the columns whose symmetry axes are disposed at the intersections of the central axes of partial light fluxes having the same parameters of coding elliptic polarization modulation, and in each pair of adjacent columns the phase $\delta$ of the light waves is shifted by the difference $\Delta\delta_i = g\pi/4$ between adjacent i-th and (i+1)-th columns of the decoding plane, or light wave polarization state is changed by implementing two mutually orthogonal polarization states for the adjacent i-th and (i+1)-th columns of the decoding plane (g=1, 2 ... ; i=1, 2, ... ).

The given task is also solved due to that the device containing a source of stereo video signal, an electronic functional module and sequentially arranged at one and the same optical axis an electrically controlled matrix-addressed polarization coding optical modulator and the polarization selector, the outputs of the latter are optically connected to the left and the right observation areas, whereas for the polarization coding optical modulator the transfer characteristic of its mn-th element is determined by inverse trigonometric functions of the ratio of linear combinations of $(S_L^{mn})^2$ and $(S_R^{mn})^2$, where $S_L^{mn}$ and $S_R^{mn}$ are the signals whose squared amplitudes correspond to the values of $B_L^{mn}$ and $B_R^{mn}$ of the mn-th pixels of the left and the right views, whereas the output of the stereo video signal source is connected to electrical input of the polarization coding optical modulator and to electrical input of the electronic functional module whose output is connected with the input of the polarization selector, where m=1, 2, ..., M, n=1, 2, ..., N, and M×N are the numbers of rows and columns in the polarization coding optical modulator; and according to the invention, the polarization coding optical modulator is implemented with a possibility to have the two mutually orthogonal directions of the working medium optical anisotropy for each pair of its n-the and (n+1)-th columns, and the polarization selector is implemented with column-based electrical addressing of its working medium layer, which have the same initial direction of optical anisotropy in the whole layer, and with a possibility to implement in each pair of its adjacent columns the two mutually orthogonal initial directions of the working medium optical anisotropy, or is implemented with a column structure of the working medium layer whose adjacent columns have the mutually orthogonal initial directions of the working medium optical anisotropy, and the plane of the working media layer of the polarization selector is located at the distance d from the plane of the working media layer of the polarization coding optical modulator, where d=Dp/b, and D is the distance between the polarization coding optical modulator and observation areas, p is a spatial period of N columns in the polarization coding optical modulator, b is the distance between the central points of any two adjacent observation areas.

Glasses-free stereo image observation takes place in the method and in the device as there is a spatially periodic modulation of light polarization and/or phase (that is implemented with use of polarization and/or phase selector with a periodic structure), this results in separation of the partial light fluxes, carrying the images of the left and the right views to the left and to the right observation areas.

The advantage of the method and the device is the full resolution of the stereo image in each view that is equal to the full display resolution M×N.

The advantage of the first embodiment of the method and the device for implementation thereof is its producibility due to a possibility to use three optical modulators with working layers having the similar structures based on 90-degrees twisted liquid crystal structure (twist-structure) in a nematic liquid crystal (LC) as a light intensity modulator, a light elliptic polarization generator and a polarization selector accordingly. The additional advantage is a higher image quality due to a possibility of mutual compensation of optical dispersions in the light elliptic polarization generator and in the polarization selector due to opposite signs of initial polarization plane rotational angles (opposite signs of a direction of twisting of liquid crystal molecules in two liquid crystal layers).

The advantage of the second embodiment of the method and the device for implementation thereof is a higher image quality as the result of mutual compensation of optical dispersions in the light elliptic polarization generator and in the polarization selector due to optical conjugation of the extraordinary ray propagating in the layer of the working media of one device with the ordinary ray propagating in the layer of the working media of the another device (due to mutual orthogonality of nematic liquid crystal orientation directors in two layers of the working media).

The advantage of the third, fourth and the fifth embodiments of the device is the increased optical efficiency due to the use of purely phase coding and decoding layers of the working medium of the polarization coding optical modulator and due the use of the phase selector that results in the need to use only two polarizers for the whole optical arrangement of the device, namely, for initial polarization of the input light flux and for polarization analysis of the output flux.

The invention will be clearer from the subsequent detailed description with references to the drawings.

BRIEF DESCRIPTION OF THE DRAWINGS

Drawings 1 to 4 illustrate implementations of the method.

Drawing 5 shows the first embodiment of the device and implementation of the method with the polarization coding optical modulator based on the effect of controlled rotation of polarization plane, and the decoding polarization selector.

Drawing 6 shows the second embodiment of the device and implementation of the method with the polarization coding modulator and the polarization selector based on electrically controlled birefringence effect.

Drawing 7 shows polarization states on the columns of the polarization coding optical modulator for the first embodiment of the device.

Drawing 8 shows a fragment of the front image of the polarization coding optical modulator row for the first embodiment of the device.

Drawing 9 is a fragment of the block diagram of the first embodiment of the device with an illustration of polarization selection of the views.

Drawing 10 is an example of the particular embodiment of the polarization selector in the form of a collection of striped linear polarizers having mutual orthogonal polarization directions.

Drawing 11 is an enlarged image of the dotted fragment in the Drawing 10.

Drawing 12 shows polarization states at the columns of the polarization coding optical modulator for the second embodiment of the device.

Drawing 13 is a fragment of the front image of the polarization coding optical modulator row for the second embodiment of the device.

Drawing 14 is a fragment of the block diagram of the second embodiment of the device implementation with an illustration of polarization selection of views.

Drawings 15 to 18 show an example of embodiment of the polarization selector in the form of column electrically addressed layer of nematic liquid crystal (LC) with various LC structure types.

Drawing 19 shows polarization states on the columns of the polarization coding optical modulator for the third embodiment of the device.

Drawing 20 is a fragment of the image of the polarization coding optical modulator row and the block diagram for the third embodiment of the device.

Drawing 21 is an example of particular embodiment of the polarization coding modulator in the form of a polarizer and two LC layers with an effect of controlled rotation of the polarization plane and with a controlled birefringence effect.

Drawing 22 shows polarization states at the columns of the polarization coding optical modulator for the fourth embodiment of the device.

Drawing 23 is a fragment of the image of the polarization coding optical modulator row and the block diagram for the fourth embodiment of the device.

Drawing 24 is an example of a particular embodiment of the polarization coding modulator in the form of a polarizer and two LC layers with the effect of controlled rotation of the polarization plane.

Drawing 25 shows opposite twist directions of LC molecules in two adjacent LC layers of the polarization coding optical modulator.

Drawing 26 shows a disposition of color pixels in the element of the polarization coding optical modulator.

Drawing 27 shows polarization states at the columns of the polarization coding optical modulator for the fifth embodiment of the device.

Drawing 28 shows a fragment of the image of the polarization coding optical modulator row and the block diagram for the fifth embodiment of the device.

Drawing 29 shows an example of embodiment of the polarization coding modulator in the form of a polarizer and two LC layers with a controlled birefringence effect.

Drawings 30 and 31 show mutually orthogonal directions of LC molecule orientations in two adjacent LC layers of the polarization coding optical modulator.

INVENTION EMBODIMENT OPTIONS

The stereo image observation method (Drawing 1) comprises the following: with help of a matrix-addressed polarization coding optical modulator (generator) 1 a light flux with complex amplitude modulation is formed, whereas integral luminosities $B_L^{mn}$ and $B_R^{mn}$ of mn-th pixels of the left L and right R views of a three-dimensional scene are presented jointly in the mn-th element of the light flux cross-section, and the parameters of the coding elliptic modulation of light polarization are given in the form of inverse trigonometric functions of algebraic relations between $B_L^{mn}$ and $B_R^{mn}$, where m=1, 2, . . . , M, n=1, 2, . . . , N, and M×N are the numbers of rows and columns in the polarization coding optical modulator where it is formed at the n-the column the n-th group of the first and the second partial light fluxes carrying information about the n-th columns of images of the left and right views accordingly, whereas the parameters of the coding elliptic polarization modulation are set mutually orthogonal as well between the two partial light fluxes in the n-th group as between the n-th and (n+1)-th groups of partial light fluxes, in decoding plane P-P' the views are decoded by using the phase and/or polarization decoder $2_\varphi$, and the polarization filtering of the light flux is performed by the polarization filter $2_P$, whereas the decoding plane is divided into the columns whose symmetry axes are disposed in the intersections of the central axes of partial light fluxes with the similar parameters of coding elliptic polarization modulation, and in each pair of the adjacent columns the light wave phase δ is shifted on a difference $\Delta\delta_i = g_i\pi/4$ between the adjacent i-th and (i+1)-th columns of the decoding plane, or the light wave polarization state is changed by setting the two mutually orthogonal polarization states for the adjacent i-th and (i+1)-th columns in the decoding plane (g=1, 2 . . . ; i=1, 2, . . . ).

The left $E_L$ and the right $E_R$ observer's eyes are disposed in the left $S_L$ and the right $S_R$ observation areas accordingly.

By using the first column of the polarization coding optical modulator 1 it is obtained the modulated light flux $1_{(L)}^{(R)}$ that includes two partial light fluxes $1^{(R)}$ and $1_{(L)}$ (Drawing 2), the first of them, that corresponds to the image of the first column of the right view, is polarized in the vertical direction (orthogonally to the drawing plane) and corresponds to an upper case symbol $^{(R)}$, and the second column, that corresponds to the image of the first column of the left view, is polarized in the horizontal direction (in the drawing plane) and corresponds to a lower case symbol $_{(L)}$. Similarly, by using the second column it is obtained the modulated light flux $2_{(R)}^{(L)}$ that includes two partial light fluxes $2^{(L)}$ and $2_{(R)}$, the first of them, that corresponds to the image of the second column of the left view, is polarized in the vertical direction, and second of them, that corresponds to the image of the second column of the right view, is polarized in the horizontal direction. The partial light fluxes $1_{(L)}$, and $3_{(L)}$ . . . and $2_{(R)}$, $4_{(R)}$ enter accordingly the left $S_L$ and the right $S_R$ observation areas without changing the initial horizontal polarization direction, as these light fluxes pass through such columns of the decoding plane that have no effect on polarization. The partial light fluxes $1^{(R)}$, $3^{(R)}$, and $2^{(L)}$, $4^{(L)}$, . . . enter accordingly the left $S_L$ and the right $S_R$ observation areas due to a change of the initial polarization direction from vertical to horizontal one under the influence of 90-degree polarization rotators, conventionalized as the elements of the polarization decoder $2_\varphi$ and located on the intersections of axes of these light fluxes in spatial decoding plane P-P'. The $2_P$ polarization filter (shown for illustrative purposes only in the form of a linear polarizer with horizontal polarization direction) transmits partial light flux with horizontal polarization direction only and it cuts off all crossbar light fluxes with a vertical polarization direction after passing through the elements of the polarization selector 2. A filtering of crossbar light fluxes is shown in greater detail in the Drawing 3 where the rejection of partial light fluxes $1^L{}_{false}$, $1^R{}_{false}$ and $2^R{}_{false}$, $2^L{}_{false}$ is shown in an expanded scale as a sequence of their vertical (in relation to the drawing plane) orientation of linear polarization when they enter the linear polarizer $2_P$, that does not permit them to propagate in the direction of the right $S_R$ (the left $S_L$) observation areas.

The geometry of the spatial filtering for the whole aperture of partial light fluxes is shown in the Drawing 4.

The device (Drawings 5 and 6) contains a source of stereo video signals 3, an electronic functional module 4 and sequentially arranged at the same optical axis an electrically controlled matrix-addressed polarization coding optical modulator 1 and a polarization selector 2, the outputs of the latter are optically connected with the left $S_L$ and the right $S_R$ observation areas, whereby the output of the stereo video signal source 3 is connected to the electrical inputs of the polarization coding optical modulator 1 and the electronic functional block 4, and the output of the latter is connected to electrical input of the polarization selector 2, and for the polarization coding optical modulator 1 the transfer characteristic of its mn-th element is determined by inverse trigonometric functions of the ratio of linear combinations $(S_L{}^{mn})^2$ and $(S_R{}^{mn})^2$, where $S_L{}^{mn}$ and $S_R{}^{mn}$ are the signals with squared amplitudes corresponding to the values $B_L{}^{mn}$ and $B_R{}^{mn}$ of the mn-th pixels of the left and of the right views, where m=1, 2, ..., M, n=1, 2, ..., N, and M×N are the numbers of rows and columns in the polarization coding optical modulator 1 that is implemented with a possibility to have the two mutual orthogonal directions of optical anisotropy of the working medium for each pair of its n-th and (n+1)-th columns. The polarization selector 2 (Drawing 6) includes sequentially optically connected a phase and/or polarization decoder $2_F$ and a polarization filter $2_P$. The polarization decoder $2_F$ is implemented with column electrical addressing of the working medium layer having one and the same initial direction of optical anisotropy for the whole layer and a possibility to provide the two mutually orthogonal directions of optical anisotropy of working media in each adjacent pair of columns or is implemented with a column structure of working medium layer where the mutual orthogonal initial directions of the medium optical anisotropy correspond to the adjacent columns. The plane of working medium layer of the polarization decoder $2_F$ is located at the distance d from the plane of working media layer of the polarization coding optical modulator 1, where d=Dp/b, and D is the distance between the polarization coding optical modulator and the observation areas, p is the spatial period of N columns of the polarization coding optical modulator, b is the distance between the central points of any two adjacent observation areas.

In the first embodiment of the device (Drawing 5) the polarization coding optical modulator 1 has the form of sequentially arranged a light intensity modulator $1_J$ and an elliptic light polarization coding modulator $1_\varphi$, the latter has at least one working medium layer with a controlled rotation of the polarization plane to angle $\varphi$, and the polarization selector 2 is a linear polarizer with various polarization directions. Any mn-th element of the light intensity modulator $1_J$ is optically connected with the corresponding mn-th element of the elliptic light polarization coding modulator $1_\varphi$. The optical transmission factor $T^{mn}$ of the mn-th element of the light intensity modulator $1_J$ is determined by the expression $$T^{mn} \sim (S_L{}^{mn})^2 + (S_R{}^{mn})^2, \quad (1)$$

where $(S_L{}^{mn})^2$ and $(S_R{}^{mn})^2$ are the mean square values of the signals that correspond to the luminosities $B_L{}^{mn}$ and $B_R{}^{mn}$ of the mn-th pixels of the left and right views, that is $$B_L{}^{mn} = c'(S_L{}^{mn})^2, \quad B_R{}^{mn} = c'(S_R{}^{mn})^2, \quad (2)$$

where c' is a proportionality constant.

The signals $(S_L{}^{mn})^2$ $(S_R{}^{mn})^2$ are obtained, for example, by using photoelectric registration of the integral luminosity $B_L{}^{mn}$ of the mn-th element of the left view and the integral luminosity $B_R{}^{mn}$ of the mn-th element of the right view (for example, by use of the corresponding photo sensors in the apertures of two video cameras located in two different data retrieval points to get the images of the two, left and right, views of the three-dimensional scene). Under condition (2) the resulting light fluxes $J_L{}^{mn}$ and $J_R{}^{mn}$, emitted by the corresponding elements of the polarization coding optical modulator 1 are linearly related to the values of luminosities $B_L{}^{mn}$ and $B_R{}^{mn}$ of the corresponding images of the mn-th elements of the left and right views of the displayed three-dimensional scene.

The polarization characteristic $\varphi^{mn}$ of the elliptic light polarization modulator $1_\varphi$ for its odd (1, ..., 2n−1, ...) columns is determined by the expression:

$$\varphi^{m(2n-1)} \sim \operatorname{arctg}\left(\frac{S_L^{m(2n-1)}}{S_R^{m(2n-1)}}\right), \quad (3)$$

and for even (2, ..., 2n, ...) columns it is determined by:

$$\varphi_\varphi^{m(2n)} \sim \operatorname{arcctg}\left(\frac{S_L^{m(2n)}}{S_R^{m(2n)}}\right). \quad (4)$$

Polarization characteristic $\varphi^{mn}$ determines the value of the angle $\varphi$, by which the light polarization plane is rotated after passing through the mn-th element of the elliptic light polarization modulator $1_\varphi$.

In the second embodiment of the device (Drawing 6) the elliptic light polarization coding modulator $1_\Delta$ has at least one working medium layer with a controlled birefringence effect having possibility to create a phase shift $\Delta$ between ordinary and extraordinary rays, and the polarization selector 2 is implemented in the form of sequentially arranged the phase decoder $2_F$ with a controlled birefringence effect and the linear polarizer $2_P$, whereas the phase decoder $2_F$ has a possibility to create a phase shift equal to it in its odd columns and zero value of the phase shift in its even columns. The optical transmission factor $T^{mn}$ of light intensity modulator $1_J$ is determined by the expression (1), and the polarization characteristic of the light elliptic polarization modulator $1_\Delta$ for its odd columns is determined by the expression $$\Delta^{m(2n-1)} \sim \arcsin\left(\frac{(S_L^{m(2n-1)})^2 - (S_R^{m(2n-1)})^2}{(S_L^{m(2n-1)})^2 + (S_R^{m(2n-1)})^2}\right), \quad (5)$$

and for even columns it is determined by the expression $$\Delta^{m(2n)} \sim \arccos\left(\frac{(S_L^{m(2n)})^2 - (S_R^{m(2n)})^2}{(S_L^{m(2n)})^2 + (S_R^{m(2n)})^2}\right). \quad (6)$$

wherein the additional phase shift $$\Delta_0 = \frac{\pi}{4}(f-1)$$

can be included, where f=1, 2, 3. For the first embodiment of the device in Drawing 5 the arrows conventionally show the mutually orthogonal directions of linear polarization corresponding to the expressions (3) and (4) along one row of the elliptic polarization coding modulator $1_\varphi$, whereas each addressed element of the latter supports polarization plane rotation effect. Drawing 6 illustrates for the second embodiment of the device the mutually orthogonal states of elliptic polarization for one row of the polarization coding modulator $1_\varphi$, whereas each addressed element of the latter causes controlled birefringence effect. In Drawing 7 one can see a map of linear polarization directions for the whole aperture of the polarization coding modulator $1_\varphi$ in the first embodiment of the device, and in Drawings 8 and 9 one can see polarization states at one row of the polarization coding modulator $1_\varphi$ and a corresponding cross-section of the components of the first embodiment of the device by a plane that is parallel to the device optical axis and passes through this row. A particular example of the polarization selector 2 in the form of striped (parallel to the columns) structure $2_S$ of the linear polarizers with mutually orthogonal directions of polarization in the adjacent columns (Drawings 10 and 11).

For the second embodiment of the device Drawing 12 shows the polarization state in the aperture of the polarization coding optical modulator $1_A$ corresponding to expressions (5), (6), Drawing 13 shows the orientation of elliptic polarization at one row of the latter, and Drawing 14 shows a cross-section of the components of the second embodiment of the device by a plane that is parallel to the device optical axis and passes through the specified row. Examples of particular embodiment of the working medium layer of the light elliptic polarization coding modulator $1_A$ with a controlled birefringence effect: it is based on LC layer 5 (Drawing 15), arranged between glass substrates 6 and 7 and electrically addressed by columns due to application of potential difference $E=E_0$ between striped electrode 8 and the common electrode 9 that has a zero potential. Particularly, LC layer 5 has the form of a nematic LC layer with homogeneous structure (Drawing 16) for LC with negative dielectric anisotropy, or with a super twist structure (Drawing 17), or with homeotropic structure (Drawing 18) for LC with negative dielectric anisotropy. An example of a particular embodiment of a working medium layer of the polarization coding modulator $1_A$ using elliptic light polarization and controlled rotation of the polarization plane has the form of column electrically addressed nematic LC layer with 90° twisted structure (Drawing 17).

In the third embodiment of the device (Drawings 19 to 21) the polarization coding optical modulator 1 has the form of sequentially optically connected an optical modulator $1_\varphi$ with controlled polarization plane rotation and a phase optical modulator $1_A$ with a controlled birefringence effect (Drawing 20) that are arranged between two linear polarizers 10 and $2^P$. Particularly, the polarization coding optical modulator $1_\varphi$ and the phase optical modulator $1_A$ have accordingly the form of matrix electrically addressed layers 11 and 12 of a nematic LC with positive dielectric anisotropy (Drawing 21), the first of them has a twist structure, and second one has a homogeneously oriented structure.

In the fourth embodiment of the device (Drawings 22 to 24) the polarization coding optical modulator 1 has the form of two sequentially optical connected optical modulators $1_{\varphi_1}$ and $1_{\varphi_1}$ (Drawing 23) with an effect of controlled polarization plane rotation that are arranged between two linear polarizers 10 and $2_P$. In the particular example optical modulators $1_{\varphi_1}$ and $1_{\varphi_2}$ have accordingly the form of matrix electrically addressed layers 13 and 14 of a nematic LC with positive dielectric anisotropy (Drawing 24) having twist structures characterized by mutually opposite twisting directions of LC molecules (Drawing 25).

In case of color imaging the polarization coding optical modulator 1 contains in each its mn-th element a group of three color filter pixels $R_{mn}$, $G_{mn}$, $B_{mn}$ (Drawing 26) that have individual electrical addressing by the rows or columns accordingly for vertical or horizontal multiplexing of color pixels.

In the fifth embodiment of the device (Drawings 27 to 31) the polarization coding optical modulator 1 has the form of two sequentially optically connected optical modulators $1_{A_1}$ and $1_{A_2}$ (Drawing 28) with a controlled birefringence effect that are arranged between two linear polarizers 10 and $2_P$. Particularly, optical modulators $1_{A_1}$ and $1_{A_2}$ have accordingly the form of matrix electrically addressed layers 15 and 16 of a nematic LC with positive dielectric anisotropy (Drawing 29) represented by homeotropic oriented structures with mutually orthogonal initial orientation of LC molecules (Drawing 30) that corresponds to mutual compensation of the frequency dispersion of phase shifts $\Delta_1$ and $\Delta_2$ (refraction indices $n_{e_1}$ and $n_{e_2}$) of the first and second LC layers 15 and 16 as the directions of propagation of extraordinary rays $e_1$ and $e_2$ (Drawing 31), that are responsible for formation of phase shifts $\Delta_1$ and $\Delta_2$, are spatially separated (they coincide with the directions of propagation of the ordinary rays $o_2$ and $o_1$ of the other LC layer), and the difference between their initial phase shifts does not contain any more a dependence on light wavelength. Dielectric anisotropy $\Delta\in$ of the LC layer, that is determined by a requirement $\Delta\in=\sqrt{n_o}-\sqrt{n_e}$, may be either positive $\Delta\in>0$ or negative $\Delta\in<0$ depending on LC material. The LC molecules with negative $\Delta\in$ are always oriented with their long axis along the applied electric field $E=E_0$, and the ones with positive $\Delta\in$ are always oriented across the field, therefore for execution of rotation of LC molecules under the influence of an external electric field, that leads to realization of electrically controlled birefringence in LC layer, in the first case the initial orientation of LC layer is chosen homogeneous (the long axes of LC molecules are oriented in one direction parallel to the glass substrates) and in the second case it is chosen homeotropic (the long axes of LC molecules are oriented orthogonally to the glass substrates). The similar axes of refractive index ellipsoids for two LC layers are the axes corresponding to the similar refractive indices (the similar axes of ellipsoids are the axes of two LC layers that correspond to the refractive index $n_e$ for the extraordinary ray or to refractive index $n_o$ for the ordinary ray).

The device operates as follows.

The operation of the first embodiment of device and the first embodiment of method embodiment (Drawing 5) is considered in the example of separation in the left $S_L$ and right $S_R$ observation windows the partial light fluxes from mn-th element of the second column of the image, in which (in parameters of elliptic modulation) the m-th elements of $S_L^{m(2)}$ and $S_R^{m(2)}$ signals of the left and the right views are jointly coded according to the expression $$\varphi^{m(2)} \sim \arctg\left[\frac{(S_L^{m(2)})^2}{(S_R^{m(2)})^2}\right] = \arctg\left(\frac{B_L^{m(2)}}{B_R^{m(2)}}\right), \quad (7)$$

that determines the angle of linear polarization rotation in the common (for both $S_L^{m(2)}$ and $S_R^{m(2)}$) light flux that corresponds to a special case of the expression (3). The parameters of the polarization modulation determined by the expression (6) are set by the elliptic polarization coding modulator $1_\varphi$ (Drawing 5, 7 and 8). Thus the intensity $J_{L+R}{}^{m(1)}$ of the specified total (summary) light flux is determined by the expression:

$$J_{L+R}^{m(2)} = B_L^{m(2)} + B_R^{m(2)} \quad (8)$$

and is set by the light intensity modulator $1_J$.

The polarization column element $2_{(2i)\varphi}$ of the polarization decoder $2_\varphi$, located along the path of the light flux from the second column of the polarization coding optical modulator 1 to the right observation area $S_R$, is characterized by the polarization direction along the X-axis (Drawing 9), and the polarization column element $2_{(2i-1)\varphi}$, located at the path of the light flux from the second column of the polarization coding optical modulator 1 to the left observation area $S_L$, is characterized by the polarization direction along the Y-axis. Linear polarization inclination angle $\varphi^{m(2)}$ with respect to X-axis and Y-axis determines the relations between light intensities $J_x^{m(2)}$ and $J_y^{m(2)}$ $$\varphi^{m(2)} = \arctg\left(\frac{J_y^{m(2)}}{J_x^{m(2)}}\right). \quad (9)$$

Intensities $J_x^{m(2)}$ and $J_y^{m(2)}$ determine the intensities of the partial light fluxes coming from the second column of the polarization coding modulator 1 accordingly to the right $S_R$ and the left $S_L$ observation areas. From (7), (8) and (9) one can receive the following system of equations $$J_x^{m(2)} + J_y^{m(2)} = B_R^{m(2)} + B_L^{m(2)}; \quad (10)$$

$$\frac{J_x^{m(2)}}{J_y^{m(2)}} = \frac{B_R^{m(2)}}{B_L^{m(2)}}.$$

From (10) it follows that $J_x^{m(2)} = B_R^{m(2)}$ and $J_y^{m(2)} = B_L^{m(2)}$. That proves that in the left and right observation areas the light fluxes with intensities $J_y^{m(2)}$ and $J_x^{m(2)}$ are equal to luminosities accordingly of the left $B_R^{m(2)}$ and the right $B_L^{m(2)}$ views of the image presented jointly at the second column of the polarization coding modulator 1. Such course of reasoning is valid for each of M image rows.

Operation of the second embodiment of the device and the second embodiment of the method embodiment (Drawings 6 and 12 to 14) is considered similarly to the first embodiment of partial light flux distribution topology from the second column of the polarization coding optical modulator 1 to the left $S_L$ and the right $S_R$ observation areas. The relation (8) holds because the intensity modulator $1_J$ is the same as the one in the first embodiment of the device. Coding elliptic modulation, formed by the phase optical modulator $1_\Delta$ due to creation of phase shift $\Delta\delta^{m(2)}$ between extraordinary and ordinary rays, is determined by the expression $$\Delta\delta^{m(2)} = \arccos\left(\frac{B_L^{m(2)} - B_R^{m(2)}}{B_L^{m(2)} + B_R^{m(2)}}\right). \quad (11)$$

The general equation for elliptical polarization is used to determine the intensities of the light flux coming to observation areas $$(E_x^{m(2)})^2 + (E_y^{m(2)})^2 - 2E_x^{m(2)}E_y^{m(2)}\cos\Delta\delta^{m(2)} = (E_0^{m(2)})^2 \sin^2\Delta\delta^{m(2)}, \quad (12)$$

where $E_x^{m(2)}$ and $E_y^{m(2)}$ are x- and y-components of the light wave electric vector, $E_0$ is the light wave amplitude;

$\Delta\delta^{m(2)}$ is the phase shift between x- and y-components of the light wave electric vector created by a controlled delay between the ordinary and the extraordinary rays.

Availability of the linear polarizer $2_P$ with polarization axis orientation along the y=x direction (Drawings 12 and 13) creates the following first polarization analysis condition for the partial light flux coming from the second column of the polarization coding optical modulator 1 to the right $S_R$ observation area $$E_x^{m(2)} = E_y^{m(2)} = E_{x=y}^{m(2)}. \quad (13)$$

Availability of an additional phase delay equal to $\pi$ along the path of the partial flux from the same column in the left observation area is equivalent to use of a vertically oriented linear polarizer, that is, it creates the second requirement of polarization analysis $$E_x^{m(2)} = E_{-y}^{m(2)} = E_{x=-y}^{m(2)}. \quad (14)$$

Substitution of (13) and (14) in the equation (12) and taking into account the ratio between the results of the substitution gives $$\frac{J_{x=y}^{mn}}{J_{x=-y}^{mn}} = \frac{1 + \cos\Delta\delta^{m(2)}}{1 - \cos\Delta\delta^{m(2)}}, \quad (15)$$

where $J_{x=-y}^{m(2)} = (E_{x=-y}^{m(2)})^2$, $J_{x=y}^{m(2)} = (E_{x=y}^{m(2)})^2$.

Substitution of (11) in (15) gives the result $$\frac{J_{x=y}^{mn}}{J_{x=-y}^{mn}} = \frac{B_L^{m(2)}}{B_R^{m(2)}}$$

and taking into account (8) leads to the relations $J_{x=-y}^{m(2)} = B_R^{m(2)}$ and $J_{y=x}^{m(2)} = B_L^{m(2)}$, at proves, that the light fluxes with intensities $J_{y=x}^{m(2)}$ and $J_{x=-y}^{m(2)}$ are equal to luminosities of the left $B_R^{m(2)}$ and the right $B_L^{m(2)}$ image views accordingly which are presented jointly at the second column of the polarization coding modulator 1 and routed in the left $S_L$ and the right $S_R$ observation areas, that is valid for each of M rows of the image.

Operation of the third embodiment of the device (Drawings 6 and Drawings from 19 to 21) is considered for the same second column of the image (n=2) as in the first and second embodiments of the device whereas the equation of elliptical polarization looks as follows $$\frac{(E_x^{m(2)})^2}{\cos^2\varphi^{m(2)}} + \frac{(E_y^{mn})^2}{\sin^2\varphi^{m(2)}} - \frac{2E_x^{m(2)}E_y^{m(2)}}{\cos\varphi^{m(2)}\sin\varphi^{m(2)}}\cos\Delta^{m(2)} = (E_0^{m(2)})^2\sin^2\Delta^{m(2)}, \quad (16)$$

whose solutions are derived under the conditions (13) and (14) determining the intensities of the light fluxes $J_{x=y}^{mn}$ and $J_{x=-y}^{mn}$ for the specified left $S_L$ and the right $S_R$ observation areas. Substitution of (13) in (16) gives following expression $$J_{x=y}^{m(2)} = \frac{(E_0^{m(2)})^2\sin^2\Delta^{m(2)}}{t_\varphi^+\cos\Delta^{m(2)}}, \quad (17)$$

where the value of $t_\phi^+$ is determined by the expression $$t_\phi^+ = \frac{\left(1+tg^2\frac{\varphi^{m(2)}}{2}\right)\left(1-tg\frac{\varphi^{m(2)}}{2}\right)^2}{tg^2\frac{\varphi^{m(2)}}{2}}. \quad (18)$$

Substitution of (14) in (16) gives the expression $$J_{x=-y}^{m(2)} = \frac{(E_0^{m(2)})^2 \sin^2\Delta^{m(2)}}{t_\phi^-\cos\Delta^{m(2)}}, \quad (19)$$

where the value of $t_\phi^-$ is determined as $$t_\phi^+ = \frac{\left(1+tg^2\frac{\varphi^{m(2)}}{2}\right)\left(1+tg\frac{\varphi^{m(2)}}{2}\right)^2}{tg^2\frac{\varphi^{m(2)}}{2}}. \quad (20)$$

The relation between (17) and (19) taking into account (10) gives $$\frac{J_{x=y}^{mn}}{J_{x=-y}^{mn}} = \frac{B_L^{mn}}{B_R^{mn}} = \left(\frac{1+\sin\frac{\varphi^{mn}}{2}}{1-\sin\frac{\varphi^{mn}}{2}}\right)^2, \quad (21)$$

from where the required value for $\phi^{m(2)}$ is $$\varphi^{m(2)} = 2\arcsin\left[\frac{\left(\sqrt{B_L^{m(2)}}-1\right)\left(\sqrt{B_R^{m(2)}}+1\right)}{\sqrt{B_L^{m(2)} B_R^{m(2)}}}\right]. \quad (22)$$

Summation of (17) and (19) leads to $$J_{x=y}^{m(2)} + J_{x=-y}^{m(2)} = A^{m(2)}\frac{1-\cos^2\Delta^{m(2)}}{\cos\Delta^{m(2)}}, \quad (23)$$

where $A^{m(2)}$ is determined by the expression $$A^{m(2)} = (E_0^{m(2)})^2 \left(\frac{\cos^2\frac{\varphi^{m(2)}}{2}\sin^2\frac{\varphi^{m(2)}}{2}}{2+\sin^2\frac{\varphi^{m(2)}}{2}}\right). \quad (24)$$

From (23) one determines the value $\Delta^{m(2)}$ of the phase shift which, taking into account (10), looks as follows $$\Delta^{m(2)} = \arccos\left(\frac{\sqrt{\frac{(B_L^{m(2)}+B_R^{m(2)})^2}{4(A^{m(2)})^2}}-B_L^{m(2)}-B_R^{m(2)}}{2A^{m(2)}}\right). \quad (25)$$

The value of polarization plane rotation angle $\phi^{m(2)}$, determined from (22) and obtained with help of the optical modulator $1_\phi$ (Drawing 20) together with the value of the phase delay $\Delta^{m(2)}$ determined from (25) and obtained with help of the optical modulator $1_\Delta$, provides formation of the corresponding partial light fluxes (with intensities determined by the luminosities of the elements of the second column of the image for the left $B_L^{m(2)}$ and for the right $B_R^{m(2)}$ views) in the left $S_L$ and the right $S_R$ observation areas.

Operation of the fourth embodiment of the device (Drawing 6 and Drawings from 22 to 25) is described by the following type of elliptical polarization equation:

$$\frac{(E_x^{m(2)})^2}{\cos^2\Delta_\varphi^{m(2)}} + \frac{(E_{x=-y}^{m(2)})^2}{\sin^2\Delta_\varphi^{m(2)}} = (E_0^{m(2)})^2, \quad (27)$$

where $\Delta_\phi^{m(2)}$ is the difference between the polarization plane rotation angles in the first $1_{\phi_1}$ and the second $1_{\phi_2}$ optical modulators ($\Delta_\phi^{m(2)} = \phi_1^{m(2)} - \phi_2^{m(2)}$).

The solution of this equation, taking into account the relations (10), gives the required values of angles $\phi_1^{m(2)}$ and $\phi_2^{m(2)}$ (transfer functions of optical modulators $1_{\phi_1}$ and $1_{\phi_2}$).

Operation of the fifth embodiment of the device (Drawing 6 and Drawings from 27 to 31) corresponds to the following type of elliptical polarization equation $$(E_{x=y}^{m(2)})^2 + (E_{x=-y}^{m(2)})^2 - 2(E_x^{m(2)})^2\cos(\Delta\delta_1^{m(2)} - \Delta\delta_2^{m(2)}) = (E_0^{m(2)})^2\sin^2(\Delta\delta_1^{m(2)}\Delta\delta_2^{m(2)})^2, \quad (28)$$

where $\Delta_1^{m(2)} - \Delta_2^{m(2)}$ is the difference between phase delays in the first $1_{\Delta_1}$ and the second $1_{\Delta_2}$ optical modulators with controlled birefringence accordingly.

The solution of this equation, taking into account the relations (10), gives the required values of phase delays $\Delta_1^{m(2)}$ and $\Delta_2^{m(2)}$ (transfer functions of optical modulators $1_{\Delta_1}$ and $1_{\Delta_2}$).

In all embodiments of the device the polarization coding optical modulator 1 can be designed on the base of both standard modern liquid crystal matrices (in the overwhelming majority of them the 90° twisted nematic LC structures are used), or using emerging LC matrices with homeotropic structures with positive dielectric anisotropy (VA or vertical alignment displays, see Amimori I. et al. Deformed nanostructure of photo-induced biaxial cholesteric films and their application in VA-mode LCDs—Journal of the SID, 2005, v. 13. No. 9, p. 799). Any light-emitting diode displays (including ones based on organic light-emitting diodes—OLED) and plasma displays can be used as the matrix-addressed light intensity generator $1_J$.

When traditional linear polarizer acts on unpolarized light flux, the resulting loss of intensity is about 50%. In the third, fourth and the fifth embodiments of the device it is possible to use not only traditional linear polarizers as the polarizer 10, but also circular polarizers based on cholesteric films, and that allows to receive the optical efficiency of unpolarized light transformation close to the limiting 100% theoretically (see Lung-Shiang Luh L. et al. A broadband circularly polarized film. —Journal of the SID, 2003, v. 11. No. 3, p. 457), that results in maximal optical efficiency of the whole device because all the components (except for the final polarizer) in the indicated embodiments of the device turn out to be purely phase or optically active by their action on polarization plane orientation, that is, they execute their functions without a substantial absorption of polarized light flux intensity.

It is expedient to use, for example, static LC panels based on π-cells (see Ezhov V. A., Studentsov S. A. Volume (or stereoscopic) images on the screens of standard computer and television displays. —Proc. SPIE, 2005, v. 5821, p. 105) or cells based on the surface mode (see U.S. Pat. No. 4,884,876) as the phase optical modulators $1_A$.

The invention is universal in regard to image observation alternatives. Observation of stereoscopic images is possible with use not only glasses-free method, but also with use of passive polarization stereo glasses with mutually orthogonal polarization filters (if observation without restriction of the user position within the admissible angular display aperture is required). For this purpose phase or polarization inhomogeneities in the polarization selector 2 are electrically switched off and the operation of the polarization filter $2_P$ is excluded by mechanical removal of this filter (if a possibility of its electrical switching-off is not provided; in the latter case the filter is made demountable). And its space alignment is not required during reinstallation as it is spatially homogeneous.

To transfer to monoscopic image (glasses-free) it is enough to switch off electrically the phase or polarization inhomogeneities in the polarization selector 2 and to send monoscopic image to the polarization coding modulator 1.

It is possible to observe two absolutely various monoscopic images by two observers simultaneously at a single display with the full resolution for each image (equal to the resolution of the display screen) if there are provided these two images instead of left and right views.

The invention claimed is:

1. A stereoscopic apparatus, comprising:
   (A) a matrix polarization encoding device, that has M rows and N columns; and
   (B) a polarization selector, that is arranged sequentially on the same optical axis as the matrix polarization encoding device;
   wherein
   (a) outputs of the selector are optically connected with left and right observation areas,
   (b) a transfer characteristic for a mn-th element of the matrix polarization encoding device is determined by an inverse trigonometric function of a ratio of an algebraic relation of $B_L^{mn}$ and $B_R^{mn}$, which are intensity values in a mn-th pixel of left and right views of a projected 3-dimensional image respectively, wherein m=1, 2, ..., M, n=1, 2, ..., N,
   (c) the matrix polarization encoding device comprises a working medium that has mutually orthogonal directions of optical anisotropy for each pair of adjacent columns of the matrix polarization encoding device; and
   (d) the polarization selector comprises a working medium comprising electrically addressable columns such that one of the following conditions is satisfied:
      (i) an initial optical anisotropy state of the polarization selector is such that all the columns of the working medium of the polarization selector have the same optical anisotropy direction, and a subsequent optical anisotropy state of the polarization selector is such that each two adjacent columns of the working medium of the polarization selector have mutually orthogonal anisotropy directions; or
      (ii) an initial optical anisotropy state of the polarization selector is such that each two adjacent columns of the working medium of the polarization selector have mutually orthogonal anisotropy directions.

2. The apparatus of claim 1, further comprising a source of stereo video signal, an electronic functional module, wherein an output of the source of the stereo video signal is connected to an electrical input of the matrix polarization encoding device and to an electrical input of the electronic functional block; and an output of the electronic functional block is connected to an electrical input of the polarization selector.

3. The apparatus of claim 1, wherein the matrix polarization encoding device is an electrically controlled matrix-addressable polarization encoding optical modulator, wherein a plane of the working medium of the polarization selector is located at a distance d from a plane of the working medium of the polarization encoding optical modulator, where d=Dp/b, and D is a distance from the polarization encoding optical modulator to the observation areas, p is a spatial period of the columns of the polarization encoding optical modulator and b is a distance between central points of adjacent observation areas.

4. The apparatus of claim 3, wherein the polarization encoding optical modulator comprises (a) a light intensity modulator and (b) an elliptical light polarization encoding modulator that comprises at least one working medium with a controlled polarization plane rotation; wherein the polarization selector comprises a linear polarizer and wherein the light intensity modulator and the elliptical light polarization modulator are arranged sequentially so that a mn-th element of the light intensity modulator corresponds to a mn-th element of the elliptical light polarization modulator.

5. The apparatus of claim 3, wherein the polarization encoding optical modulator comprises sequentially arranged (a) a light intensity modulator and (b) an elliptical light polarization encoding modulator that comprises at least one working medium with a controlled birefringence and wherein the polarization selector comprises sequentially arranged (i) a phase decoder with a controlled birefringence and (ii) a linear polarizer, wherein the phase decoder is configured to create a phase shift between ordinary and extraordinary beams, which is equal to it in odd columns of the decoder and zero in even columns of the decoder.

6. The apparatus of claim 3, wherein the polarization encoding optical modulator comprises (a) a polarizer; (b) a first phase and/or polarization optical modulator; (b) a second phase and/or polarization optical modulator, wherein the polarizer, the first modulator and the second modulator are sequentially optically connected.

7. The apparatus of claim 6, wherein the first modulator is an optical modulator with a controlled polarization plane rotation, while the second modulator is a phase optical modulator with a controlled birefringence.

8. The apparatus of claim 6, wherein each of the first and second modulators is an optical modulator with a controlled polarization plane rotation.

9. The apparatus of claim 6, wherein each of the first and second modulators is an optical modulator with a controlled birefringence.

10. The apparatus of claim 6, wherein the polarizer is a linear or circular polarizer.

11. A stereoscopic method comprising:
   (A) forming using a first device, that has M rows and N columns, a modulated light flux that has a complex modulation of intensity and polarization, such that a mn-th element of a cross section of the light flux presents jointly $B_L^{mn}$ and $B_R^{mn}$, which are intensity values in a mn-th pixel of left and right views of a projected 3-dimensional image, whereas polarization modulation parameters of the modulated light flux are set as an inverse trigonometric function of an algebraic relation between $B_L^{mn}$ and $B_R^{mn}$, wherein m=1, 2, ..., M, n=1, 2, ..., N, are respectively numbers of rows and columns of the first device; said forming comprises forming N groups of the modulated light flux, wherein an n-th group of the N groups, that is formed on an nth column of the first device, comprises a left and right partial light fluxes, which carry respectively information about an n-th column for the left and right views of the projected 3-dimensional image, whereas the polarization modulation parameters of the modulated light flux are mutually orthogonal (i) between the left and the right partial light fluxes for each of the N groups and (ii) between a partial light flux of the nth group and a partial flux of the (n+1) th group, which is adjacent to the nth group; and (B) for each of the N groups, separating from the formed modulated light flux, using a second device, the left partial light flux and the right partial light flux and directing the left and right partial light fluxes to left and right observation areas respectively; said second device comprises a decoder and a polarization filter; wherein said separating comprises:

(i) decoding left and right views of the modulated light flux at a decoding plane of the decoder and (ii) filtering the decoded light flux, wherein the decoding plane of the decoder is divided into columns, each of which has a symmetry axis at an intersection of central axes of partial light fluxes with identical elliptical polarization modulation parameters, wherein said columns of the decoding plane of the decoder are such that one of the following two conditions is satisfied:

(a) a phase shift between each pair of adjacent columns in the decoding plane is $\pi/4$ multiplied by a positive integer; and (b) adjacent columns of the decoding plane produce mutually orthogonal changes of a polarization state.

12. The method of claim 11, wherein the first device is a matrix addressable polarization encoding optical modulator.

13. The method of claim 11, wherein:

(a) said forming the modulated light flux comprises encoding an elliptical polarization modulation in the modulated light flux using a matrix electrically addressable optical modulator with a controlled polarization plane rotation, which comprises N columns, such that a polarization plane rotation angle in each odd (2n−1)-th column is $$\varphi^{m(2n-1)} \approx \arctan\left(\frac{B_L^{m(2n-1)}}{B_R^{m(2n-1)}}\right),$$

while a polarization plane rotation angle in each even column 2n-th column is $$\varphi^{m(2n)} \approx \operatorname{arccot}\left(\frac{B_L^{m(2n)}}{B_R^{m(2n)}}\right);$$

wherein an intensity of light in the a mn-th element of a cross section of the formed modulated light flux corresponds to a sum of $B_L^{mn}$ and $B_R^{mn}$, and (b) said decoding is performed using an electrically addressable by column optical modulator with a controlled polarization plane rotation by setting a value of a polarization plane rotation angle in each pair of adjacent columns of said electrically addressable by column optical modulator to be mutually orthogonal.

14. The method of claim 11, wherein:

(a) said forming the modulated light flux comprises encoding an elliptical polarization modulation in the modulated light flux using a matrix electrically addressable optical modulator with a controlled birefringence, which comprises N columns, such that a phase shift $\Delta\delta^{m(2n-1)}$ between ordinary and extraordinary beams in each odd (2n−1)-th column and a phase shift $\Delta\delta^{m(2n)}$ between ordinary and extraordinary beams in each even column 2n-th column are set respectively to be arccos and arcsin functions of a ratio of an algebraic relation of $B_L^{mn}$ and $B_R^{mn}$ with addition of $\pi/4$ multiplied by a non-negative integer; wherein an intensity of light in an mn-th element of a cross section of the formed modulated light flux corresponds to a sum of $B_L^{mn}$ and $B_R^{mn}$, and (b) said decoding is performed using an electrically addressable by column optical modulator with a controlled birefringence by setting a value of a difference in a phase shift between ordinary and extraordinary beams for each pair of adjacent columns to be $\pi/4$ multiplied by a positive integer.

15. The method of claim 11, wherein said forming the modulated light flux comprises encoding an elliptical polarization modulation of the modulated light flux using the following elements that are sequentially positioned and optically connected: (i) a polarizer, (ii) a first matrix electrically addressable optical modulators with a controlled birefringence, that has M rows and N columns, and (iii) a second matrix electrically addressable optical modulators with a controlled birefringence, that has M rows and N columns, wherein a resulting phase shift $\Delta\delta_1^{m(2n-1)} - \Delta\delta_2^{m(2n-1)}$ between ordinary and extraordinary beams in each odd (2n−1)-th column and a resulting phase shift $\Delta\delta_1^{m(2n)} - \Delta\delta_1^{m(2n)}$ between ordinary and extraordinary beams in each even column 2n-th column of both the first and the second optical modulators are set respectively to be arccos and arcsin functions of a ratio of an algebraic relation of $B_L^{mn}$ and $B_R^{mn}$ with addition of $\pi/4$ multiplied by a non-negative integer.

16. The method of claim 11, wherein said forming the modulated light flux is performed using the following elements that are sequentially positioned and optically connected: (i) a polarizer, (ii) a first matrix electrically addressable optical modulators with a controlled polarization plane rotation, that has M rows and N columns and (iii) a second matrix electrically addressable optical modulator with a controlled polarization plane rotation, that has M rows and N columns, wherein a resulting angle of polarization plane rotation $\phi_1^{m(2n-1)} - \phi_2^{m(2n-1)}$ in each odd (2n−1)-th column and a resulting angle of polarization plane rotation $\phi_1^{m(2n)} - \phi_2^{m(2n)}$ in each even column 2n-th column of both the first and the second optical modulators are set respectively to be $$\varphi_1^{m(2n-1)} - \varphi_2^{m(2n-1)} \approx \arctan\left(\frac{B_L^{m(2n-1)}}{B_R^{m(2n-1)}}\right)$$

and $$\varphi_1^{m(2n)} - \varphi_2^{m(2n)} \approx \operatorname{arccot}\left(\frac{B_L^{m(2n)}}{B_R^{m(2n)}}\right).$$

17. The method of claim 11, wherein said forming the modulated light flux is performed using the following elements that are sequentially positioned and optically connected: (i) a polarizer, (ii) a first matrix electrically addressable optical modulators with a controlled polarization plane rotation, that has M rows and N columns and (iii) a second matrix electrically addressable optical modulators with a controlled birefringence, that has M rows and N columns.

18. The method of claim 11, wherein said decoding is performed using a controlled or static polarization filter that creates mutually orthogonal polarization states between adjacent columns of the decoding plane.

19. The method of claim 18, wherein said polarization filter is (a) a linear polarization filter that creates mutually orthogonal linear polarization states between adjacent columns of the decoding plane or (b) a circular polarization filter that creates mutually orthogonal circular polarization states between adjacent columns of the decoding plane.

* * * * *